United States Patent
Dutta

(10) Patent No.: US 6,865,559 B2
(45) Date of Patent: Mar. 8, 2005

(54) METHOD AND SYSTEM IN ELECTRONIC COMMERCE FOR INSPECTION-SERVICE-BASED RELEASE OF ESCROWED PAYMENTS

(75) Inventor: Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 678 days.

(21) Appl. No.: 09/732,479

(22) Filed: Dec. 7, 2000

(65) Prior Publication Data

US 2002/0073049 A1 Jun. 13, 2002

(51) Int. Cl.$^7$ .............................................. G06F 17/60
(52) U.S. Cl. .............................. 705/75; 705/1; 705/77; 705/78; 705/50; 705/64; 705/26; 705/35; 713/150
(58) Field of Search ........................ 705/75, 77, 78, 705/1, 50, 64, 26, 27, 35; 713/150, 155, 156, 175; 380/200, 255

(56) References Cited

U.S. PATENT DOCUMENTS

| | | | | |
|---|---|---|---|---|
| 6,108,639 A | * | 8/2000 | Walker et al. | 705/26 |
| 2001/0037247 A1 | * | 11/2001 | Haseltine | 705/22 |
| 2001/0056395 A1 | * | 12/2001 | Khan | 705/37 |
| 2002/0073114 A1 | * | 6/2002 | Nicastro et al. | 707/500 |

FOREIGN PATENT DOCUMENTS

| WO | WO 00/046712 | * | 8/2000 | G06F/17/60 |
|---|---|---|---|---|

OTHER PUBLICATIONS

"ebay—Escrow Overview", http://pages.ebay.com/help/community/escrow.html, Jan. 1, 2000.

* cited by examiner

Primary Examiner—James P. Trammell
Assistant Examiner—Jalatee Worjloh
(74) Attorney, Agent, or Firm—Leslie Van Leeuwen; Joseph R. Burwell

(57) ABSTRACT

A method, apparatus, system, or computer program product facilitates trustworthy electronic commerce by providing an inspection-service-based release of an escrowed payment for a transaction involving physical goods. An inspection service stands as an independent party at the onset of the transfer of goods between the buyer and the seller. In an attempt to reduce fraudulent behavior by the buyer or the seller, an inspection service inspects the goods, preferably at the point of shipment. A description of the goods has been previously stored in a transaction record that has been previously created within an escrow service. The inspection service may electronically retrieve the description of the goods from the escrow service. The inspection service then determines whether the description of the goods is acceptably similar to the actual condition or type of the goods and generates a certification if they are acceptable similar. The inspection service may then electronically notify the escrow service of the certification, and the escrow service may release the escrowed payment if the goods are accepted by the other party.

21 Claims, 5 Drawing Sheets

METHOD AND SYSTEM IN ELECTRONIC COMMERCE FOR INSPECTION-SERVICE-BASED RELEASE OF ESCROWED PAYMENTS

BACKGROUND OF THE INVENTION

1. Field of the Invention

The present invention relates to an improved data processing system and, in particular, to a method and system for automated electrical business practice. Still more particularly, the present invention provides a method and system for an electronic commerce transaction for physical goods using an online escrow agent.

2. Description of Related Art

The amount of digital commerce has increased enormously with the growth of the Internet. With the rapid expansion of electronic commerce, the incidence of fraud for online commerce transactions has started to rise for both auction transactions and traditional sales transactions. Fraud can be present during an online transaction whether or not the transaction is between private individuals, commercial entities, or both, and whether or not the transaction occurs through a public click-and-order Web site, an online auction Web site, or some other type of electronic exchange.

An electronic transaction for physical goods between two physically distant parties is inherently difficult as the buyer and the seller must exchange information concerning the goods without an immediate physical inspection of the goods. With the growth of the Internet, the exchange of information has increasingly occurred on the World Wide Web rather than through mail catalogs, brochures, letters, etc. Various electronic services have become available to facilitate sales by allowing a buyer and a seller to visual inspect digital images of the goods. For example, one corporation provides server software that allows a buyer to visually inspect a product by easily and quickly magnifying detailed digital images of a product without requiring massive amounts of digital data to be sent to the buyer. Another corporation provides client-server software that allows a buyer to visually inspect a product by browsing so-called 360-degree images.

An electronic transaction for physical goods between two physically distant parties clearly increases the potential for fraud by removing the immediate physical inspection and transport of goods that occurs during traditional sales transactions. While digital image software enhances the exchange of information, the images are not necessarily representative of the physical goods that are shipped by the seller. A buyer that participates in an online transaction is much more likely to be struck by the old practice of "bait and switch". In some cases, the seller might not ship the goods that the buyer expected to receive or, possibly, does not ship any goods at all. In less serious cases, the buyer may receive the correct goods but not in the condition that was expected. In any case, the buyer generally has very limited ability to correct the fraud.

In addition to buyer-side risks, the seller also enters into an online transaction with some risk. For example, the buyer might refuse to pay for goods after the seller has shipped the goods. In other cases, the buyer might receive the goods and decide to return the goods. However, the seller might not receive the goods in the condition in which the seller shipped the goods. In some cases, the buyer may actually use a product, subjecting the product to wear-and-tear, prior to shipping the product back to the seller. In these cases, the seller might also have very limited ability to receive just compensation.

In order to protect two physically distant parties that are participating in an electronic transaction for physical goods, electronic escrow services have been developed. Electronic escrow services operate in a manner similar to traditional escrow services in which money or property is placed in the custody of a third party until a specified condition has been fulfilled. For example, an electronic escrow service holds electronic funds, such as credit card transactions, electronic cash payments, etc., until the transaction parties are satisfied with the physical exchange of goods associated with the electronic financial transaction.

However, electronic escrow services do not eliminate all potential types of fraudulent behavior. For example, a buyer can be dissatisfied with received goods and can indicate to the electronic escrow service that the goods are being returned, which occurs occasionally in the normal course of business, whether or not an electronic escrow service is involved in the transaction. After the seller receives the returned goods, however, the seller has the ability to fraudulently state to the electronic escrow service that the returned goods were not received by the seller in their originally shipped condition. Hence, even though an electronic escrow service acts as an independent third party, the possibility for fraudulent behavior still exists. Even if the escrow service requests evidence of damage or wear-and-tear on the returned goods, the proffered evidence does not necessarily represent the returned goods.

Therefore, it would be advantageous to provide a method and system for minimizing disputes between two physically distant parties that are participating in an electronic transaction for physical goods. It would be particularly advantageous to provide a method and system that is economically efficient for both the buyer and the seller in the transaction.

SUMMARY OF THE INVENTION

A method, apparatus, system, or computer program product facilitates trustworthy electronic commerce by providing an inspection-service-based release of escrowed payments for a transaction involving physical goods. An escrow service receives a transaction message that includes a description of goods to be transferred during a purchase of goods by a buyer from a seller. The escrow service then accepts payment for the goods from the buyer, and the escrow service notifies the seller of the escrowed payment. The escrow service then receives a certification message that indicates that the physical state of the goods is acceptably similar to the previously specified description of the goods during an inspection of the goods by an inspection service. The escrow service then receives an acceptance message that indicates an acceptance of the goods received from the seller by the buyer, and the escrow service releases payment for the goods to the seller.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a method and system for allowing a buyer and a seller to rely upon an inspection service to inspect goods involved in a transaction at the point of shipment of the goods. The inspection service is integrated with an electronic/online escrow service; after the inspection, the inspection service transmits information to the escrow service. Therefore, as background, a typical organization of hardware and software components within a distributed data processing system is described prior to describing the present invention in more detail.

Figure 1A:
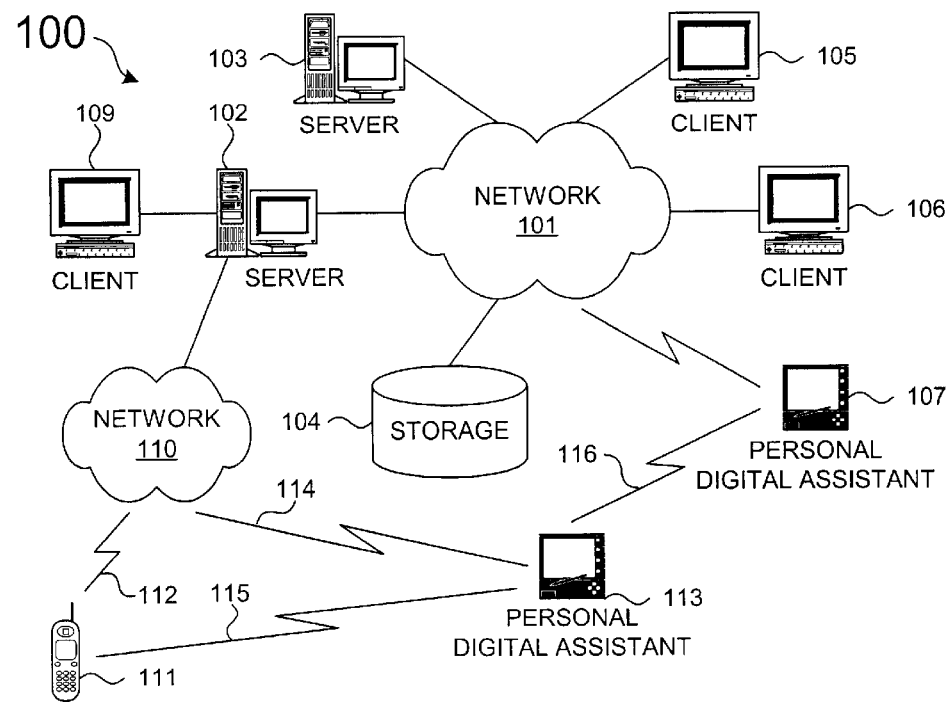
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, and other devices that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention.

Figure 1B:
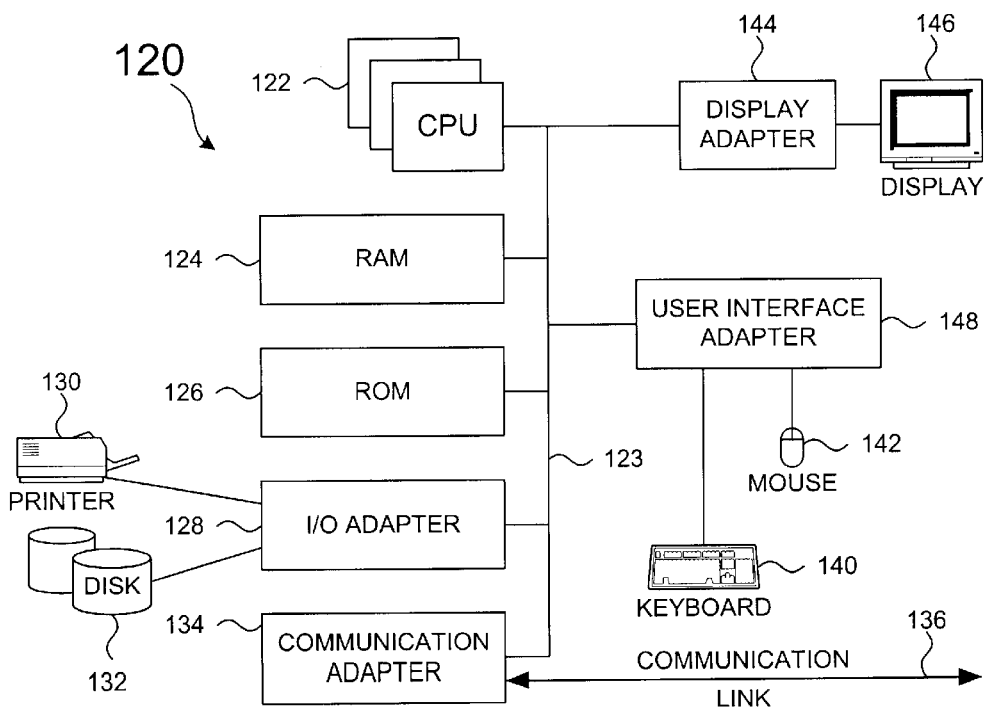
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to providing a method and system in electronic commerce for inspection-service-based release of escrowed payments for a transaction involving physical goods. As background, a typical electronic escrow service is described prior to describing the present invention in more detail.

Figure 1C:
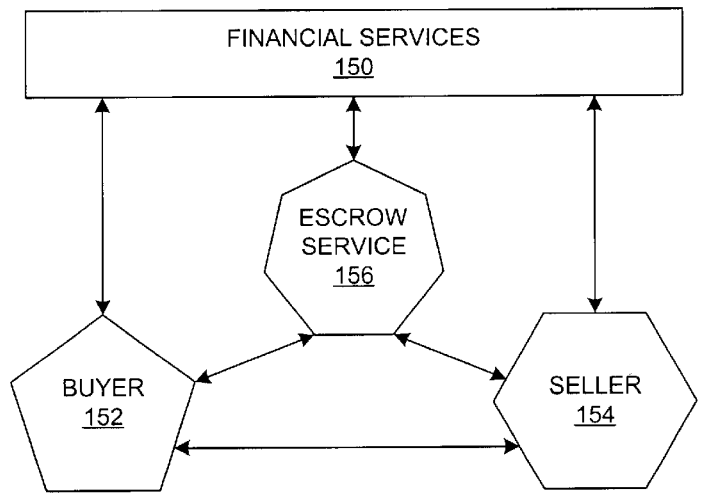
FIG. 1C is a block diagram depicting the parties that are involved in a typical electronic escrow service.

With reference now to FIG. 1C, a block diagram depicts the parties that are involved in a typical electronic escrow service. Financial services 150 represents a financial infrastructure of banks, electronic payment services, credit card services, etc., that are used generally available to the public for transacting commerce with legal tender. Buyer 152, seller 154, and escrow service 156 use financial services 150 as necessary or as appropriate to transact electronic commerce (e-commerce).

For example, at some point in time, escrow service 156 holds a payment from buyer 152 in escrow, i.e., a so-called escrowed payment. The escrowed payment is held in the custody of escrow service 156 until a specified condition has been fulfilled, which, in the ordinary course of events, would be the successful receipt of goods by buyer 152 from seller 154. After buyer 152 notifies escrow service 156 that the received goods are acceptable, escrow service 156 releases the escrowed payment to seller 154. As part of the entire transaction, the escrow service earns a fee, either by keeping a percentage of the purchase price or by charging the seller a separate fee. The nature of the buyer and the seller are not relevant to the explanation of FIG. 1C nor to the present invention; either the buyer, the seller, or both, may be private individuals, private institutions, public institutions, corporations, partnerships, cooperatives, etc.

Moreover, the nature of the goods with respect to explanation of FIG. 1C and the present invention is also irrelevant. Depending upon the implementation, the goods may be data that is to be provided by the seller, i.e., the present invention may also be applicable to escrow payments held in custody until the seller provides data files. For example, the seller may have agreed to deliver digital photos of a certain type and quality to the buyer.

To accomplish the payment transfers amongst the parties, it can be assumed that the parties have agreed to one or more specific payment methods, which would involve the use of financial services 150 in some manner. Acceptable payment methods may include, but are not limited to, such valuable transfers as cash, checks, credit/debit cards, electronic funds transfers (EFTs), secure electronic transactions (SETs), digital micropayments, digital cash, and digital award program benefits. The electronic transfers may occur over various types of networks, such as network 101 shown in FIG. 1A.

To accomplish a transaction, all of the parties to the transaction may send and receive various types of communications, including electronic messages in various formats that are transmitted across various types of networks, such as telephone circuits or other types of networks, such as network 101 shown in FIG. 1A. For example, when negotiating a transaction, buyer 152 and seller 154 may exchange physical mail, electronic mail (e-mail), digital image files, etc.

As another example, buyer 152 and/or seller 154 may register with escrow service 156 to create an account that is used to initiate a formal transaction via escrow service 156. To do so, the escrow service must authenticate the account holder in some manner, and it may be assumed that the escrow service authenticates the user at least partially electronically through credit bureaus, credit card companies, or other institutions as necessary.

It may also be assumed that the escrow service provides some type of electronic access to its services so that parties may create accounts and transact business with the escrow service. For example, registered and non-registered users may access the escrow service through the World Wide Web using browser-type applications on clients, such as the clients shown in FIG. 1A. The escrow service may operate servers, similar to those shown in FIG. 1A, that provide Web pages that allow users to send and receive information from the escrow service in a manner that is well-known in the art. Although the escrow service may process electronic payments and may conduct some of its business through Internet-based or Web-based applications, it should be understood that the escrow service may also accept payments and/or communications in other manners that do not use the Internet or other digital information services.

Figure 1D:
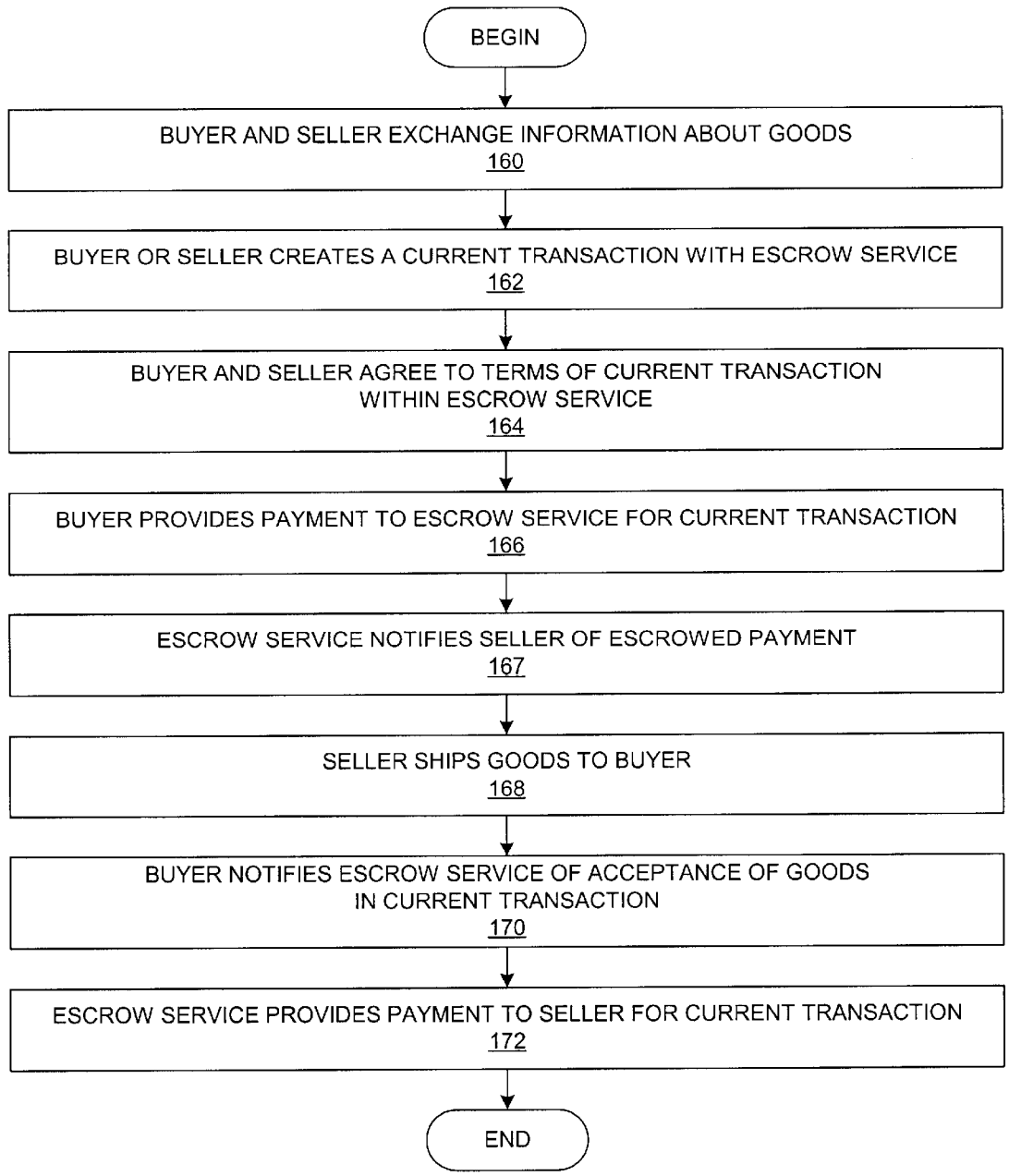
FIG. 1D is a flowchart depicting a process showing the operations or actions of the parties that are involved in a typical electronic escrow service.

With reference now to FIG. 1D, a flowchart depicts a process showing the operations or actions of the parties that are involved in a typical electronic escrow service. The process begins with the buyer and seller exchanging information about goods to be purchased by the buyer from the seller (step 160). The buyer and the seller may have agreed to enter a transaction on their own accord or through some other means, such as an online commercial Web site or an online auction site. To conclude the transaction, the buyer and the seller have agreed to use an escrow service to facilitate the transaction. The agreement to use an escrow service may be done explicitly, or the parties may have agreed implicitly as it may have been required of all transaction that are conducted through a particular Web site.

In order to complete the transaction via the escrow service, either the buyer or the seller creates a current transaction within the escrow service (step 162). Assuming that the buyer and the seller are both interacting with the escrow service completely electronically, both the buyer and seller would have previously registered with the escrow service so that the escrow service has identity information and other types of information for both parties, as may be accomplished in well-known manners in the art. The current transaction would be associated with some type of transaction identifier (ID) or other tracking code.

At some point, both the buyer and the seller agree to be contractually bound by the terms of the current transaction (step 164) such that each party has duties and responsibilities towards the other party. After the agreement, the buyer provides payment in some form to the escrow service for the current transaction (step 166). After receiving the buyer's payment, the escrow service notifies the seller that the payment has been escrowed (step 167), and the seller ships the goods in the appropriate manner to the buyer (step 168).

After the buyer receives the goods, the buyer inspects the goods, and if they are satisfactory, then the buyer notifies the escrow service (step 170). The escrow service then provides payment to the seller (step 172), and the process is complete.

Although not shown in FIG. 1D, if the buyer is not satisfied with the goods, then the process operates almost in reverse; in one perspective, the initial process "unwinds" or "runs backwards". The buyer can notify the escrow service that the goods are not satisfactory and return the goods to the seller. Once the seller has notified the escrow service that the goods have been returned, then the escrow service can return the original payment to the buyer minus the escrow service fee.

As may be apparent with respect to FIG. 1C and FIG. 1D, there are still points within the transaction during which either party may be defrauded as electronic escrow services do not eliminate all potential types of fraudulent behavior. For example, a buyer might receive inadequate goods and then return the goods, but if the escrow service operates in the above-described manner, then the buyer loses a portion of the payment.

In another scenario, after the seller receives the returned goods, the seller has the ability to fraudulently state to the electronic escrow service that the returned goods were not received by the seller in their originally shipped condition. In that case, the buyer may lose a significant portion of the payment to the seller. Hence, even though an electronic escrow service acts as an independent third party, the possibility for fraudulent behavior still exists. Even if the escrow service requests evidence of damage or wear-and-tear on the returned goods, the proffered evidence does not necessarily represent the returned goods.

The present invention reduces the risks of the parties by inserting an inspection service into the transaction. The inspection service provides an independent, objective assessment of the condition or type of goods that are being shipped between the parties, and the escrow service does not release the escrowed payment until notified by the inspection service that the goods that are shipped and/or received are of the type and in the condition previously recorded in the transaction record kept by the escrow service. The following figures describe the process in more detail.

Figure 2A:
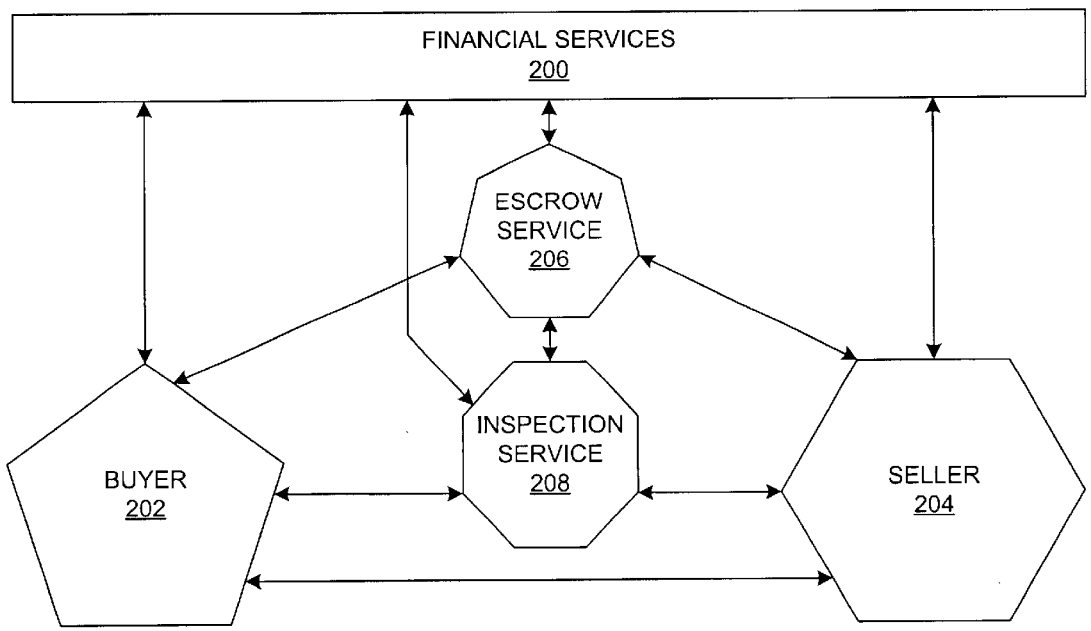
FIG. 2A is a block diagram depicting the parties that are involved in a transaction that uses an inspection-based release of an escrowed payment in electronic commerce in accordance with a preferred embodiment of the present invention.

With reference now to FIG. 2A, a block diagram depicts the parties that are involved in a transaction that uses an inspection-based release of an escrowed payment in electronic commerce in accordance with a preferred embodiment of the present invention. FIG. 2A is similar to FIG. 1C in that a buyer, a seller, an escrow service, and financial services are involved in a purchase and exchange of goods. Financial services 200 represents a financial infrastructure of banks, electronic payment services, credit card services, etc., that are used generally available to the public for transacting commerce with legal tender. Buyer 202, seller 204, and escrow service 206 use financial services 200 as necessary or as appropriate to transact electronic commerce (e-commerce). For a given transaction, escrow service 206 holds a payment from buyer 202 in escrow until the successful receipt of goods by buyer 202 from seller 204. As part of the entire transaction, the escrow service earns a fee.

In the prior art, after the buyer notifies the escrow service that the received goods are acceptable, the escrow service releases the escrowed payment to the seller. In contrast with the prior art, the present invention inserts inspection service 208 into the transaction.

Inspection service 208 inspects the goods at substantially the same time that the goods are being shipped. The necessary or expected conditions or types of the goods can be retrieved by the transaction record that has been previously created within the escrow service. Inspection service 208 can retrieve the needed information electronically from the escrow service.

For example, assuming that the escrow service provides a Web site for handling the electronic actions, notifications, communications, etc., between the parties, then the inspection service logs into the escrow service, e.g., by presenting the proper credentials through a digital certificate using a browser-type application.

The shipping party would supply the inspection service with some form of transaction identifier for the current transaction between the buyer and the seller. The inspection service would then present the transaction identifier to the escrow service to retrieve the appropriate information.

The inspection service can determine whether the actual physical condition of the goods is acceptable similar to or acceptable matches the description of the goods that had been previously negotiated as a condition for the current transaction. A standard for determining an acceptable match may be specified by the buyer, the seller, both the buyer and the seller, by the escrow service, or by the inspection service. For example, one judgment level for an acceptable match may be a "substantial match" while another judgment level for an acceptable match may be an "approximate match". If the actual condition and the description match to an acceptable degree, then the inspection service notifies the escrow service, preferably through some sort of electronic means. At that point, similar to the prior art, the escrow service then releases the escrowed payment.

Inspection service 208 also has access to financial services 200, and inspection service 208 also earns a fee as part of the entire transaction, either by receiving a percentage of the purchase price from the escrow service or by charging the escrow service, the buyer, or the seller a separate fee.

In an attempt to reduce fraudulent behavior by the buyer or the seller, the inspection service inspects the goods prior to shipment but preferably at the point of shipment, i.e., the points at which the buyer and/or seller release physical possession of the goods, depending upon which direction the goods are being shipped. If the seller is sending the goods to the buyer, then the seller presents the goods to the inspection service at the point of shipment. The certification of the goods by the inspection service minimizes fraud by the buyer as the inspection service stands as an independent party at the onset of the transfer of goods between the seller and the buyer.

If the buyer is returning goods to the seller, then the buyer presents the goods to the inspection service at the point of shipment. The certification of the goods by the inspection service minimizes fraud by the seller as the inspection service stands as an independent party at the onset of the transfer of goods between the buyer and the seller. Hence, the inspection service is also reversible so that fraudulent behavior from the seller can also be minimized.

As a practical matter so that the inspection service can perform its responsibilities efficiently, it is assumed that the inspection or certification of the goods occurs at the same location that the shipping party releases the goods, such as at a parcel delivery company, an overnight delivery company, a general courier, or a private mailbox provider.

The party that is responsible for the inspection service may vary depending upon the implementation of the present invention, although the inspection or certification clearly should not be performed by either the buyer or the seller as it should be assumed that neither of these parties would always be objective. The inspection or certification of the goods may be performed by the delivery company, if necessary, although it should be noted that the delivery company may not be objective as the delivery company incurs liability by attempting to deliver the goods in their original condition.

In one embodiment, a shipment preparation company is the party that acts as the inspection service. For example, many private mailbox providers also provide other types of services, such as boxing things for shipment. In this case, an employee of the shipment preparation company may not only accept the goods for transfer to a delivery company but may also act as an agent for the inspection service.

In another embodiment, an employee of an inspection service provider performs the inspection or certification but does so at a location owned or controlled by another entity, such as a private mailbox provider or a delivery company.

In yet another embodiment, the inspection service is performed at a location that is separate from the point of shipment, but the goods are somehow stamped or sealed in a tamper-proof manner with an inspection service identifier to prevent the shipping party from tampering with the goods after inspection/certificaiton and to provide evidence to the receiving party that the goods had been inspected/certified prior to shipment.

It should also be noted that the inspection service and the escrow service can be performed by the same entity. In other words, certain persons, institutions, corporations, etc., may act as both escrow agent and inspection agent. This remains true whether or not the inspection agent is also an employee or agent of a shipment preparation company, delivery company, etc.

Figure 2B:
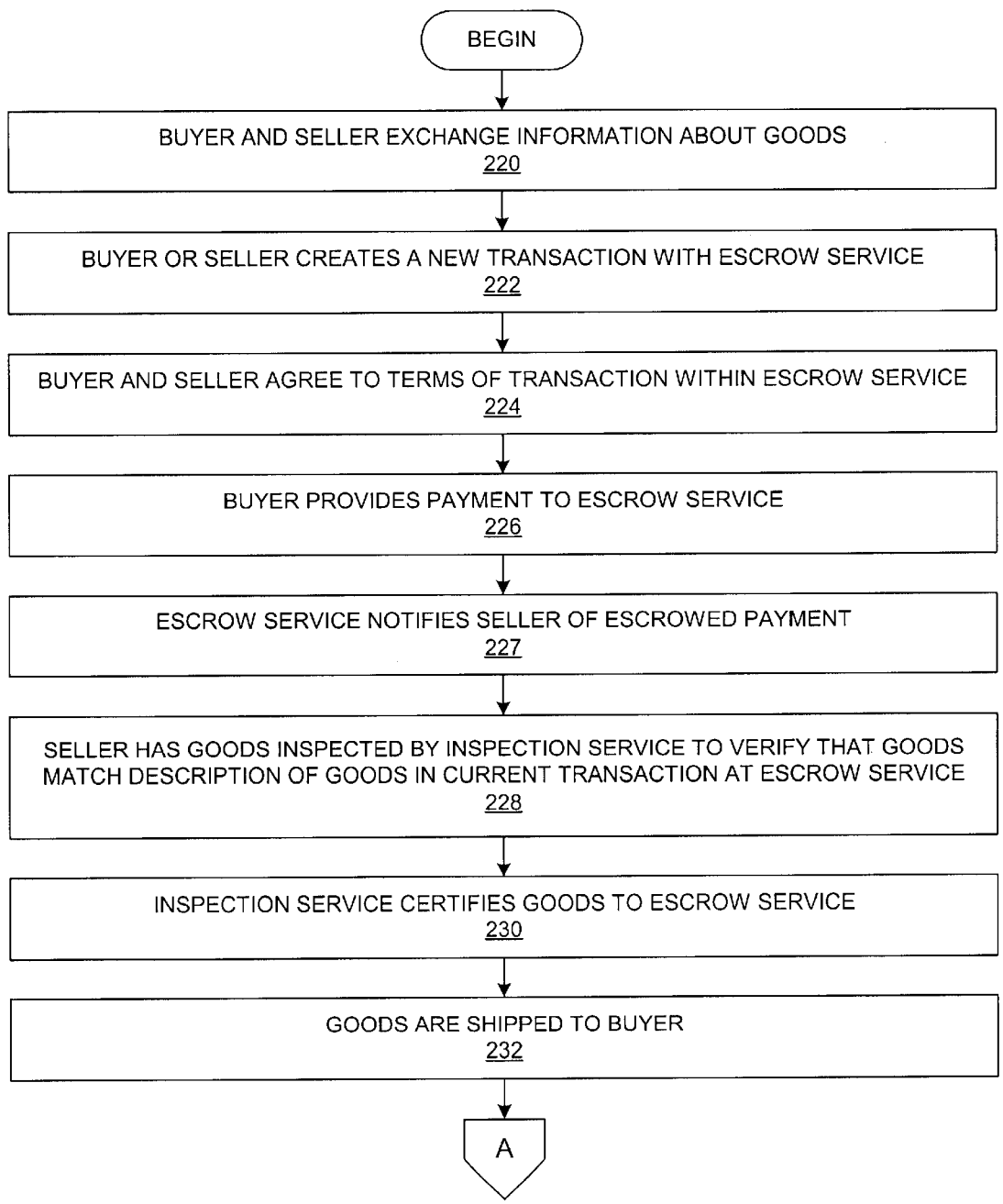
FIGS. 2B–2C are flowcharts depicting a process showing the operations or actions of the parties that are involved in a transaction that uses an inspection-based release of an escrowed payment in electronic commerce in accordance with a preferred embodiment of the present invention.
Figure 2C:
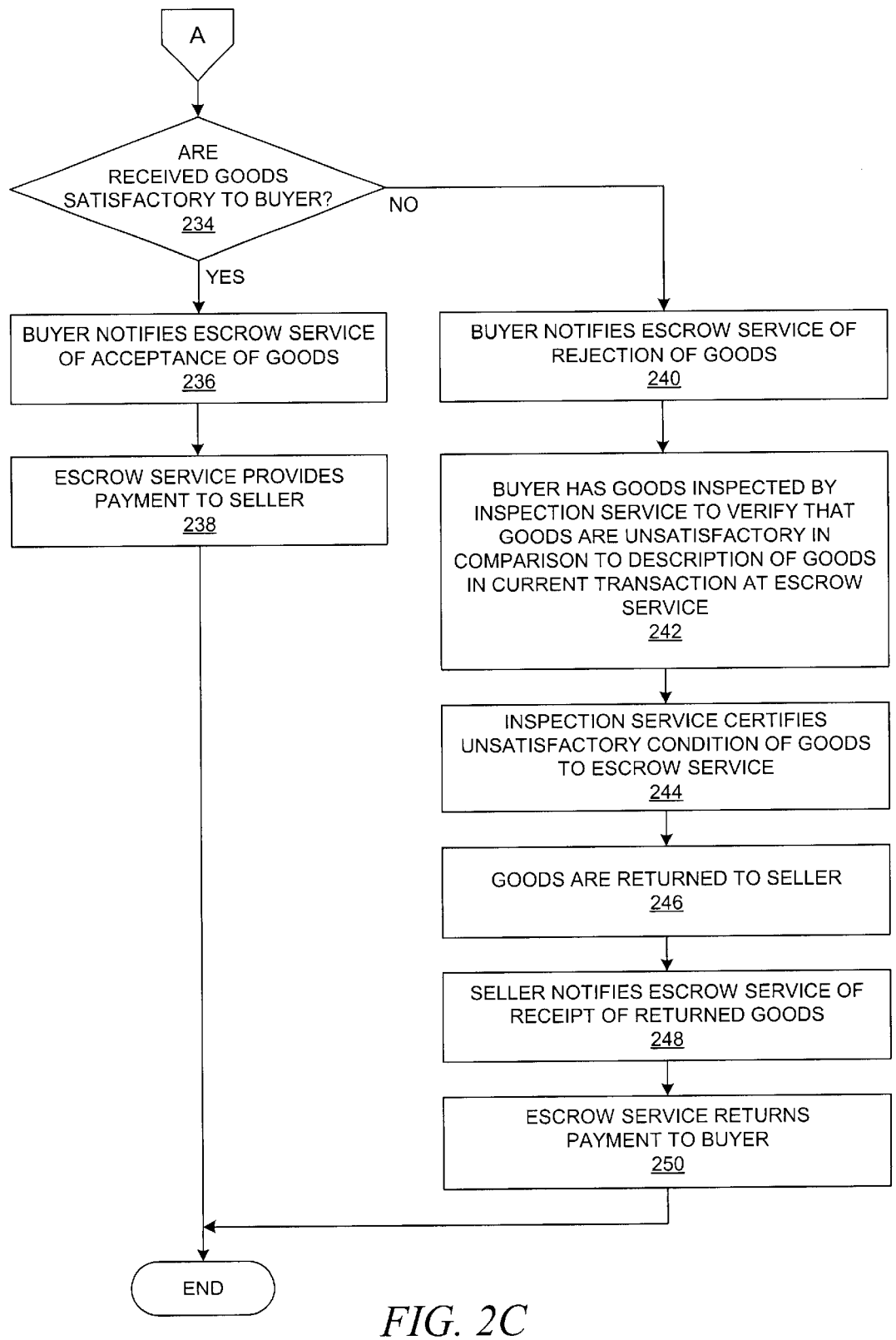

With reference now to FIGS. 2B–2C, flowcharts depict a process showing the operations or actions of the parties that are involved in a transaction that uses an inspection-based release of an escrowed payment in electronic commerce in accordance with a preferred embodiment of the present invention. The process begins with the buyer and seller exchanging information about goods to be purchased by the buyer from the seller (step 220). The buyer and the seller may have agreed to enter a transaction on their own accord or through some other means, such as an online commercial Web site or an online auction site. To conclude the transaction, the buyer and the seller have agreed to use an escrow service and an inspection service to facilitate the transaction. Again, the escrow service and the inspection service may be performed by a single entity that has assumed the responsibilities of escrow agent and inspection agent. The agreement to use an escrow service may be done explicitly, or the parties may have agreed implicitly as it may have been required of all transaction that are conducted through a particular Web site.

In order to complete the transaction via the escrow service, either the buyer or the seller creates a new, current transaction within the escrow service (step 222) in which the transaction contains a description of the goods to be exchanged. In a preferred embodiment, one of the parties completes an electronic form and submits it electronically as a transaction message to the escrow service. In response, the escrow service creates a transaction record within some type of transaction database. At this point, a description of the goods to be exchanged should be stored and controlled by the escrow service. The description may be represented in any acceptable data format.

Assuming that the buyer and the seller are both interacting with the escrow service completely electronically, both the buyer and seller would have previously registered with the escrow service so that the escrow service has identity information and other types of information for both parties, as may be accomplished in well-known manners in the art. The transaction record representing the current transaction would be associated with some type of transaction identifier (ID) or other tracking code. The tracking code may be presented as necessary to be used by the escrow service, the inspection service, a financial service, the shipment preparation service, or the delivery service.

At some point, both the buyer and the seller agree to be contractually bound by the terms of the current transaction (step 224) such that each party has duties and responsibilities towards the other party.

After the agreement, the buyer provides payment in some form to the escrow service for the current transaction (step 226). After receiving the buyer's payment, the escrow service notifies the seller, preferably with some type of escrowed payment notification message, that the payment has been escrowed and/or that the seller may proceed with sending the goods (step 227).

The seller then has the goods inspected/certified by the inspection service to verify that the goods match the description of the goods that is stored within the current transaction record within the escrow service (step 228). Preferably, the inspection service electronically retrieves the description of the goods from the escrow service.

Alternatively, the description can be supplied by the buyer, the seller, and/or both. In this case, the description passes "out-of-band" from the escrow service. It should be noted, however, that the out-of-band description should somehow indicate that the out-of-band description accurately reflects the previously agreed upon terms for the condition and/or type of goods. In one embodiment, the description could have been digitally signed or otherwise cryptographically processed to ensure its authenticity.

Assuming that the goods are acceptable, then the inspection service certifies the goods to the escrow service (step 230), preferably using some type of certification message that identifies the current transaction so that the certification can be matched to the appropriate transaction by the escrow service. If the goods are not acceptable, then the inspection service would notify the escrow service that the goods do not match their description, and the escrow service would notify the buyer.

Preferably, the certification is made directly from the inspection service to the escrow service by sending an appropriate indication, message, or signal to the escrow service. Alternatively, the inspection service may generate certification data that has been digitally signed or otherwise cryptographically processed to ensure its authenticity. The inspection service could then give the certification to the shipping party, who would then be required to supply the certification to the escrow service to receive the escrowed payment. Since the certification would have been previously digitally signed, the shipping party would not be able to tamper with the certification.

After notifying the escrow service of the satisfactory state of the goods, the goods are shipped in the appropriate manner to the buyer (step 232). After the buyer receives the goods, the buyer inspects the goods and determines whether or not the goods are satisfactory (step 234).

If the goods are satisfactory, then the buyer notifies the escrow service (step 236), preferably using some type of acceptance message that identifies the current transaction so that the acceptance can be matched to the appropriate transaction by the escrow service. The escrow service then provides payment to the seller (step 238), and the process is complete. Again, the payment to the seller may be reduced by the fees of the escrow service and the inspection service.

If the buyer is not satisfied with the goods, then the transaction can also unwind or run backwards. The buyer can notify the escrow service that the goods are not satisfactory (step 240), preferably using some type of rejection message that identifies the current transaction so that the rejection can be matched to the appropriate transaction by the escrow service. The buyer then has the goods inspected/certified by the inspection service, which compares the condition of the received goods with the description of the goods for the current transaction (step 242). Occasionally, goods may be damaged in transit for various reasons, such as improper packaging. In addition, goods may contain hidden defects or may break or fail during normal and proper use. The buyer and the seller may have previously agreed to terms that govern these types of events, such as a guarantee that the goods may be returned to the seller.

The inspection service would then notify the escrow service of the condition or state of the goods (step 244), and the escrow service would preferably notify the seller. The buyer then ships the goods to the seller (step 246). Once the seller has notified the escrow service that the goods have been returned (step 248), then the escrow service can return the original payment to the buyer minus an escrow service fee and inspection fee (step 250).

The advantages of the present invention should be apparent in view of the detailed description of the invention that is provided above. An electronic transaction for physical goods between two physically distant parties increases the potential for fraud by removing the immediate physical inspection and transport of goods that occurs during traditional sales transactions. If fraudulent behavior occurs, the buyer and the seller may have very limited ability to receive just compensation. Prior art electronic escrow services do not eliminate all potential types of fraudulent behavior.

The present invention provides a method and system for minimizing disputes between two physically distant parties that are participating in an electronic transaction for physical goods. An inspection service at the points of shipment, i.e., the points at which the buyer and seller release and/or acquire physical possession of the goods, reduces the ability of both the buyer and seller to misrepresent the condition of the goods. The inspection service is economically efficient because both the buyer and the seller usually interact personally with another party to ship the goods involved in a transaction.

An increasing number of transactions are occurring through electronic commerce. As people get more comfortable with purchasing goods via the World Wide Web, the sale of more expensive items, such as cars, jewelry, furniture, etc., may migrate to the domain of electronic commerce. Even in transactions involving inexpensive goods, the present invention increases trust between parties in e-commerce transactions, after which parties may engage in more complex and expensive transfers of goods.

The inspection service provides a cost effective method for characterizing goods in a transaction, particularly within many countries in which service costs are relatively inexpensive compared to the cost of goods. In many countries, litigation is prohibitively expensive, and it is assumed that the cost of the inspection service would be reasonable and attractive. In the case of transnational shipments, the inspection service of the present invention may be the only way to protect the buyer and the seller.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing a transaction in electronic commerce using data processing systems, the method comprising the computer-implemented steps of:

receiving a transaction message at a data processing system of an escrow service, wherein the transaction message comprises a description of goods to be transferred during a transaction between a seller of the goods and a buyer of the goods;

accepting payment for the goods from the buyer at the escrow service;

in response to accepting payment for the goods from the buyer, sending by the escrow service to the seller a notification message of acceptance of payment for the goods;

holding the payment in escrow by the escrow service;

sending by the escrow service to an inspection service a description message that describes the goods to be transferred during the transaction;

receiving at the escrow service from the inspection service a first certification message for the transaction after accepting payment for the goods from the buyer and before receipt of the goods by the buyer, wherein the first certification message indicates that a physical state of the goods is acceptably similar to the description of the goods during an inspection of the goods by the inspection service.

2. The method of claim 1 further comprising:

receiving an acceptance message at the escrow service from the buyer, wherein the acceptance message indicates an acceptance of goods received from the seller by the buyer; and releasing payment for the goods from the escrow service to the seller.

3. The method of claim 1 further comprising:

receiving a rejection message at the escrow service from the buyer, wherein the rejection message indicates a rejection of goods received from the seller by the buyer;

receiving a second certification message at the escrow service from the inspection service, wherein the certification message indicates an inspection of the goods by the inspection service; and returning payment for the goods to the buyer from the escrow service.

4. The method of claim 1 further comprising:

releasing payment for the goods to the seller by the escrow service in response to receiving an acceptance message at the escrow service from the buyer, wherein the acceptance message indicates an acceptance of goods received from the seller by the buyer; and returning payment for the goods to the buyer from the escrow service in response to receiving a rejection message at the escrow service from the buyer and receiving a second certification message at the escrow service from the inspection service, wherein the rejection message indicates a rejection of goods received from the seller by the buyer, and wherein the second certification message indicates an inspection of the goods by the inspection service after receipt of the goods by the buyer.

5. A method for processing a transaction in electronic commerce using data processing systems, the method comprising the computer-implemented steps of:

receiving from a buyer or a seller at an inspection service a transaction identifier for the transaction, wherein the transaction identifier provides an association between the transaction and an electronic description of goods to be transferred during the transaction between the seller of the goods and the buyer of the goods;

retrieving from an escrow service by the inspection service the electronic description of the goods associated with the transaction; and sending a first certification message for the transaction from the inspection service to the escrow service after the escrow service has accepted payment for the goods from the buyer and before receipt of the goods by the buyer, wherein the certification message comprises the transaction identifier, and wherein the certification message indicates that a physical state of the goods is acceptably similar to the electronic description of the goods during an inspection of the goods by the inspection service.

6. The method of claim 5 further comprising:

sending a second certification message from the inspection service to the escrow service, and wherein the second certification message indicates an inspection of the goods by the inspection service after receipt of the goods by the buyer.

7. The method of claim 6 further comprising:

sending the second certification message after the escrow service has received a rejection message from the buyer, wherein the rejection message indicates a rejection of goods received from the seller by the buyer.

8. An apparatus for processing a transaction in electronic commerce using data processing systems, the apparatus comprising:

first receiving means for receiving a transaction message at a data processing system of an escrow service, wherein the transaction message comprises a description of goods to be transferred during a transaction between a seller of the goods and a buyer of the goods;

accepting means for accepting payment for the goods from the buyer at the escrow service;

first sending means for sending by the escrow service to the seller a notification message of acceptance of payment for the goods in response to accepting payment for the goods from the buyer;

holding means for holding the payment in escrow by the escrow service;

second sending means for sending by the escrow service to an inspection service a description message that describes the goods to be transferred during the transaction;

second receiving means for receiving at the escrow service from the inspection service a first certification message for the transaction after accepting payment for the goods from the buyer and before receipt of the goods by the buyer, wherein the first certification message indicates that a physical state of the goods is acceptably similar to the description of the goods during an inspection of the goods by the inspection service.

9. The apparatus of claim 8 further comprising:

third receiving means for receiving an acceptance message at the escrow service from the buyer, wherein the acceptance message indicates an acceptance of goods received from the seller by the buyer; and releasing means for releasing payment for the goods from the escrow service to the seller.

10. The apparatus of claim 8 further comprising:

fourth receiving means for receiving a rejection message at the escrow service from the buyer, wherein the rejection message indicates a rejection of goods received from the seller by the buyer;

fifth receiving means for receiving a second certification message at the escrow service from the inspection service, wherein the certification message indicates an inspection of the goods by the inspection service; and returning means for returning payment for the goods to the buyer from the escrow service.

11. The apparatus of claim 8 further comprising:

releasing means for releasing payment for the goods to the seller by the escrow service in response to receiving an acceptance message at the escrow service from the buyer, wherein the acceptance message indicates an acceptance of goods received from the seller by the buyer; and returning means for returning payment for the goods to the buyer from the escrow service in response to receiving a rejection message at the escrow service from the buyer and receiving a second certification message at the escrow service from the inspection service, wherein the rejection message indicates a rejection of goods received from the seller by the buyer, and wherein the second certification message indicates an inspection of the goods by the inspection service after receipt of the goods by the buyer.

12. A apparatus for processing a transaction in electronic commerce using data processing systems, the apparatus comprising:

first receiving means for receiving from a buyer or a seller at an inspection service a transaction identifier for the transaction, wherein the transaction identifier provides an association between the transaction and an electronic description of goods to be transferred during the transaction between the seller of the goods and the buyer of the goods;

retrieving means for retrieving from an escrow service by the inspection service the electronic description of the goods associated with the transaction; and first sending means for sending a first certification message for the transaction from the inspection service to the escrow service after the escrow service has accepted payment for the goods from the buyer and before receipt of the goods by the buyer, wherein the certification message comprises the transaction identifier, and wherein the certification message indicates that a physical state of the goods is acceptably similar to the electronic description of the goods during an inspection of the goods by the inspection service.

13. The apparatus of claim 12 further comprising:

second sending means for sending a second certification message from the inspection service to the escrow service, and wherein the second certification message indicates an inspection of the goods by the inspection service after receipt of the goods by the buyer.

14. The apparatus of claim 13 further comprising:

third sending means for sending the second certification message after the escrow service has received a rejection message from the buyer, wherein the rejection message indicates a rejection of goods received from the seller by the buyer.

15. A computer program product on a computer readable medium for use in a data processing system for processing a transaction in electronic commerce using data processing systems, the computer program product comprising:

instructions for receiving a transaction message at a data processing system of an escrow service, wherein the transaction message comprises a description of goods to be transferred during a transaction between a seller of the goods and a buyer of the goods;

instructions for accepting payment for the goods from the buyer at the escrow service;

instructions for sending by the escrow service to the seller a notification message of acceptance of payment for the goods in response to accepting payment for the goods from the buyer;

instructions for holding the payment in escrow by the escrow service;

instructions for sending by the escrow service to an inspection service a description message that describes the goods to be transferred during the transaction;

instructions for receiving at the escrow service from the inspection service a first certification message for the transaction after accepting payment for the goods from the buyer and before receipt of the goods by the buyer, wherein the first certification message indicates that a physical state of the goods is acceptably similar to the description of the goods during an inspection of the goods by the inspection service.

16. The computer program product of claim 15 further comprising:

instructions for receiving an acceptance message at the escrow service from the buyer, wherein the acceptance message indicates an acceptance of goods received from the seller by the buyer; and instructions for releasing payment for the goods from the escrow service to the seller.

17. The computer program product of claim 15 further comprising:

instructions for receiving a rejection message at the escrow service from the buyer, wherein the rejection message indicates a rejection of goods received from the seller by the buyer;

instructions for receiving a second certification message at the escrow service from the inspection service, wherein the certification message indicates an inspection of the goods by the inspection service; and instructions for returning payment for the goods to the buyer from the escrow service.

18. The computer program product of claim 15 further comprising:

instructions for releasing payment for the goods to the seller by the escrow service in response to receiving an acceptance message at the escrow service from the buyer, wherein the acceptance message indicates an acceptance of goods received from the seller by the buyer; and instructions for returning payment for the goods to the buyer from the escrow service in response to receiving a rejection message at the escrow service from the buyer and receiving a second certification message at the escrow service from the inspection service, wherein the rejection message indicates a rejection of goods received from the seller by the buyer, and wherein the second certification message indicates an inspection of the goods by the inspection service after receipt of the goods by the buyer.

19. A computer program product on a computer readable medium for use in a data processing system for processing a transaction in electronic commerce using data processing systems, the computer program product comprising:

instructions for receiving from a buyer or a seller at an inspection service a transaction identifier for the transaction, wherein the transaction identifier provides an association between the transaction and an electronic description of goods to be transferred during the transaction between the seller of the goods and the buyer of the goods;

instructions for retrieving from an escrow service by the inspection service the electronic description of the goods associated with the transaction; and instructions for sending a first certification message for the transaction from the inspection service to the escrow service after the escrow service has accepted payment for the goods from the buyer and before receipt of the goods by the buyer, wherein the certification message comprises the transaction identifier, and wherein the certification message indicates that a physical state of the goods is acceptably similar to the electronic description of the goods during an inspection of the goods by the inspection service.

20. The computer program product of claim 19 further comprising:

instructions for sending a second certification message from the inspection service to the escrow service, and wherein the second certification message indicates an inspection of the goods by the inspection service after receipt of the goods by the buyer.

21. The computer program product of claim 20 further comprising:

instructions for sending the second certification message after the escrow service has received a rejection message from the buyer, wherein the rejection message indicates a rejection of goods received from the seller by the buyer.

* * * * *